United States Patent
Lu et al.

(10) Patent No.: US 9,083,826 B2
(45) Date of Patent: Jul. 14, 2015

(54) TRACKING THE PROCESSING OF ELECTRONIC DOCUMENT DATA BY NETWORK SERVICES USING TRACE

(75) Inventors: Zhenyu Lu, Sunnyvale, CA (US); Guiluan Luo, Dublin, CA (US); Jiang Hong, San Jose, CA (US); Kaoru Watanabe, Sunnyvale, CA (US); Jayasimha Nuggehalli, Cupertino, CA (US)

(73) Assignee: RICOH COMPANY, LTD., Tokyo (JP)

( * ) Notice: Subject to any disclaimer, the term of this patent is extended or adjusted under 35 U.S.C. 154(b) by 180 days.

(21) Appl. No.: 12/873,034

(22) Filed: Aug. 31, 2010

(65) Prior Publication Data

US 2012/0050772 A1 Mar. 1, 2012

(51) Int. Cl.
*G06F 3/12* (2006.01)
*H04N 1/00* (2006.01)
*H04N 1/32* (2006.01)

(52) U.S. Cl.
CPC ....... *H04N 1/00204* (2013.01); *H04N 1/00244* (2013.01); *H04N 1/00408* (2013.01); *H04N 1/00424* (2013.01); *H04N 1/00474* (2013.01); *H04N 1/00482* (2013.01); *H04N 1/32122* (2013.01); *H04N 2201/001* (2013.01); *H04N 2201/0039* (2013.01); *H04N 2201/0094* (2013.01); *H04N 2201/3202* (2013.01); *H04N 2201/3205* (2013.01); *H04N 2201/3216* (2013.01); *H04N 2201/3219* (2013.01); *H04N 2201/3221* (2013.01); *H04N 2201/3222* (2013.01); *H04N 2201/3223* (2013.01)

(58) Field of Classification Search
CPC ............ G06F 17/30011; G06F 3/1204; G06F 3/1205; G06F 3/1208; G06F 3/1273; G06F 3/1288; G06F 3/1259; H04N 1/00204; H04N 1/00244; H04N 1/32122; H04N 2201/3202; H04N 2201/3205; H04N 2201/3219; H04N 2201/3222; H04N 1/00474; G03G 15/5075
USPC .......... 358/1.15, 443, 1.13; 705/28; 709/205, 709/218, 224; 379/100.1; 707/E17.005
See application file for complete search history.

(56) References Cited

U.S. PATENT DOCUMENTS 5,412,710 A  5/1995 Tanaka
6,594,351 B1 * 7/2003 Bhogal et al. ............ 379/100.01
(Continued)

OTHER PUBLICATIONS

U.S. Appl. No. 12/892,155, Filed Sep. 28, 2010, Final Office Action.

*Primary Examiner* — Benny Q Tieu
*Assistant Examiner* — Juan M Guillermety
(74) *Attorney, Agent, or Firm* — Hickman Palermo Becker Bingham LLP; Edward A. Becker

(57) ABSTRACT

An approach is provided for tracking the processing of electronic document data by network services. One or more network services receive, from a network device, such as a multi-function peripheral (MFP), electronic document data that represents one or more electronic documents. A trace network service determines whether tracing has been specified for the electronic document data. In response to determining that tracing has been specified for the electronic document data, the trace network service tracks the processing of the electronic document data by the one or more network services. The trace network service generates trace report data that indicates results of the processing of the electronic document data by the one or more network services. The trace network service also transmits the trace report data to one or more specified recipients.

17 Claims, 5 Drawing Sheets

(56) References Cited

U.S. PATENT DOCUMENTS

| | | |
|---|---|---|
| 7,755,788 B2 | 7/2010 | Corona |
| 2003/0117642 A1 | 6/2003 | Haraguchi |
| 2004/0010431 A1 | 1/2004 | Thomas et al. |
| 2004/0172621 A1 | 9/2004 | Guillorit |
| 2004/0181749 A1 | 9/2004 | Chellapilla et al. |
| 2005/0105135 A1 | 5/2005 | Takahashi |
| 2006/0044587 A1 | 3/2006 | Yoshida |
| 2006/0074849 A1 | 4/2006 | Lee |
| 2006/0245003 A1 | 11/2006 | Stumbo et al. |
| 2006/0274361 A1 | 12/2006 | Kobayashi et al. |
| 2007/0027894 A1 | 2/2007 | Bridges et al. |
| 2007/0208877 A1 | 9/2007 | Kelley |
| 2007/0220475 A1 | 9/2007 | Asahara |
| 2007/0236749 A1 | 10/2007 | Henry et al. |
| 2008/0002220 A1 | 1/2008 | Song |
| 2008/0014906 A1 | 1/2008 | Tysowaski et al. |
| 2008/0094666 A1 | 4/2008 | Gordon et al. |
| 2008/0163364 A1 * | 7/2008 | Ferlitsch ............... 707/E17.005 |
| 2008/0222655 A1 | 9/2008 | Sato |
| 2008/0239362 A1 * | 10/2008 | Kasai et al. ................. 358/1.14 |
| 2008/0295156 A1 | 11/2008 | Kitada |
| 2009/0015877 A1 * | 1/2009 | Connors ....................... 358/443 |
| 2009/0024751 A1 | 1/2009 | Taniguchi et al. |
| 2009/0070121 A1 | 3/2009 | Leonelli et al. |
| 2009/0116052 A1 | 5/2009 | Matsuzawa |
| 2009/0171910 A1 | 7/2009 | Sarkeshik |
| 2009/0185219 A1 | 7/2009 | Yagi |
| 2009/0222534 A1 | 9/2009 | Kitada |
| 2009/0258758 A1 | 10/2009 | Hickman et al. |
| 2009/0303505 A1 | 12/2009 | Yago |
| 2009/0319400 A1 * | 12/2009 | Pratt .............................. 705/28 |
| 2010/0079797 A1 | 4/2010 | Ohara |
| 2010/0082470 A1 | 4/2010 | Walach et al. |
| 2010/0085598 A1 | 4/2010 | Kobayashi et al. |
| 2010/0149565 A1 * | 6/2010 | Mori ............................. 358/1.9 |
| 2010/0150397 A1 | 6/2010 | Handley et al. |
| 2010/0188419 A1 * | 7/2010 | Ratnakar et al. ............. 345/619 |
| 2010/0241611 A1 | 9/2010 | Zuber |
| 2010/0293386 A1 | 11/2010 | Kezzou et al. |
| 2011/0019821 A1 * | 1/2011 | Kino ........................... 358/1.15 |
| 2011/0043853 A1 * | 2/2011 | Omori ......................... 358/1.15 |
| 2011/0170139 A1 * | 7/2011 | Shozaki ...................... 358/1.15 |
| 2012/0050819 A1 | 3/2012 | Hong |
| 2013/0100482 A1 * | 4/2013 | Liu et al. .................... 358/1.15 |

\* cited by examiner

```
┌──────────────────────────────────────────────────────────────────┐
│ MFP SCANS ONE OR MORE PRINTED DOCUMENTS WITH TRACE AND GENERATES │ 302
│                    SCANNED DOCUMENT DATA                         │
└──────────────────────────────────────────────────────────────────┘
                                  ↓
┌──────────────────────────────────────────────────────────────────┐
│        MFP TRANSMITS SCANNED DOCUMENT DATA TO NETWORK SERVICE    │ 304
└──────────────────────────────────────────────────────────────────┘
                                  ↓
┌──────────────────────────────────────────────────────────────────┐
│       NETWORK SERVICE PROCESSES THE SCANNED DOCUMENT DATA AND THE│ 306
│               TRACE SERVICE TRACKS THE PROCESSING                │
└──────────────────────────────────────────────────────────────────┘
                                  ↓
┌──────────────────────────────────────────────────────────────────┐
│  THE TRACE SERVICE GENERATES TRACE REPORT DATA THAT INDICATES    │ 308
│ RESULTS OF THE NETWORK SERVICE PROCESSING THE SCANNED DOCUMENT   │
│                              DATA                                │
└──────────────────────────────────────────────────────────────────┘
                                  ↓
┌──────────────────────────────────────────────────────────────────┐
│  THE TRACE SERVICE TRANSMITS THE TRACE REPORT DATA TO ONE OR MORE│ 310
│                           RECIPIENTS                             │
└──────────────────────────────────────────────────────────────────┘
```

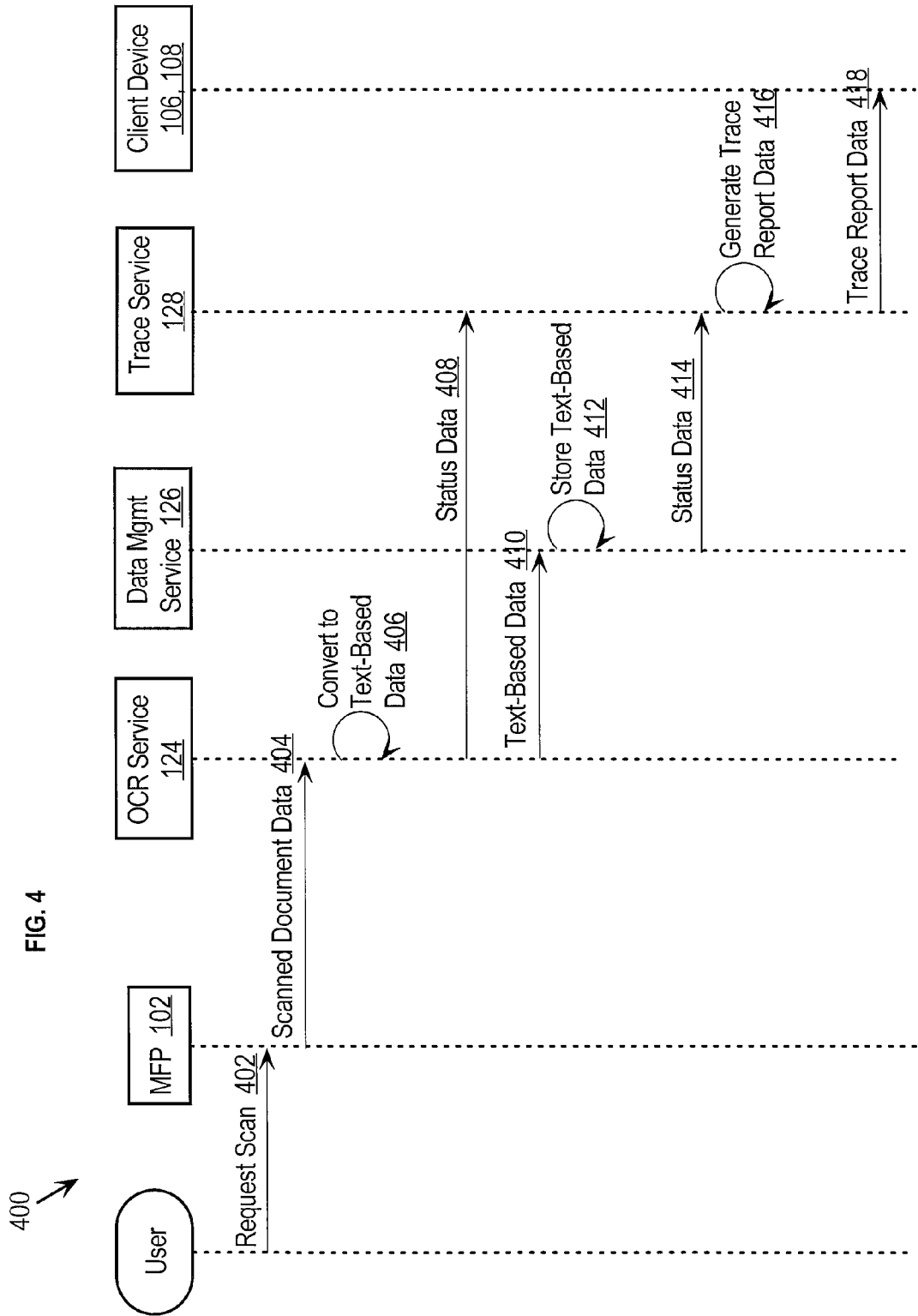

US 9,083,826 B2

TRACKING THE PROCESSING OF ELECTRONIC DOCUMENT DATA BY NETWORK SERVICES USING TRACE

FIELD OF THE INVENTION

This invention relates generally to scanning technology, and more specifically, to an approach for processing scanned document data using trace.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

One of the benefits of network computing, sometimes referred to as "cloud computing," is that applications and data can be hosted remotely on one or more network devices and accessed from multiple client devices at different locations. Changes to applications can be made centrally, without having to update large number of copies of applications on client devices. Also, storage and processing bandwidth can be quickly increased or decreased as needed. Despite these benefits, network computing arrangements have some drawbacks. One of the issues network computing arrangements is that users do not have much visibility into the state of the processing that occurs in the server systems or the cloud. For example, suppose that a user uses a scanning device to scan a printed document and generate scanned document data. Suppose further that the user requests that the scanned document data be transmitted to an optical character recognition (OCR) service in the cloud and then have the results of the OCR service stored at an archival service in the cloud. If an error occurs during processing, a user may not be aware that the error occurred, or the details of the error. For example, a user may not be able to determine where the error occurred and the location and/or state of data. This can be a significant issue when compliance regulations or audit rules require confirmation about the state of processing in network computing systems.

SUMMARY

An approach is provided for tracking the processing of electronic document data by network services. One or more network services receive, from a network device, such as a multi-function peripheral (MFP), electronic document data that represents one or more electronic documents. Examples of electronic document data include, without limitation, scanned document data, print data and facsimile data. A trace network service determines whether tracing has been specified for the electronic document data. In response to determining that tracing has been specified for the electronic document data, the trace network service tracks the processing of the electronic document data by the one or more network services. The trace network service generates trace report data that indicates results of the processing of the electronic document data by the one or more network services. The trace network service also transmits the trace report data to one or more specified recipients. The approach allows tracking of the processing of electronic document data by one or more network services, which is particularly useful for satisfying audit or legal requirements.

According to one aspect of the invention, a computer-implemented method tracks the processing of electronic document data by one or more network services. One or more network services receive, from a multi-function peripheral (MFP) over a network, electronic document data that represents one or more electronic documents. A trace network service determines whether tracing has been specified for the electronic document data. In response to determining that tracing has been specified for the electronic document data, the trace network service tracks the processing of the electronic document data by the one or more network services. The trace network service generates trace report data that indicates results of the processing of the electronic document data by the one or more network services and transmits the trace report data to one or more specified recipients.

BRIEF DESCRIPTION OF THE DRAWINGS

In the figures of the accompanying drawings like reference numerals refer to similar elements.

FIG. 3 is a block diagram that depicts an example architecture of a mobile wireless device.

FIG. 4 is a message ladder diagram that depicts an example message exchange between elements of FIG. 1 while tracking the processing of electronic document data using trace.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
  II. TRACE ARCHITECTURE
  III. USING TRACE TO TRACK THE PROCESSING OF ELECTRONIC DOCUMENT DATA BY NETWORK SERVICES
    A. Initiating Trace
    B. Performing Trace
    C. Reporting Trace
  IV. Implementation Mechanisms I. Overview An approach is provided for tracking the processing of electronic document data by network services. One or more network services receive, from a network device, such as a multi-function peripheral (MFP), electronic document data that represents one or more electronic documents. Examples of electronic document data include, without limitation, scanned document data, print data and facsimile data. A trace network service determines whether tracing has been specified for the electronic document data. In response to determining that tracing has been specified for the electronic document data, the trace network service tracks the processing of the electronic document data by the one or more network services. The trace network service generates trace report data that indicates results of the processing of the electronic document data by the one or more network services. The trace network service also transmits the trace report data to one or more specified recipients. The approach allows tracking of the processing of electronic document data by one or more network services, which is particularly useful for satisfying audit or legal requirements.

II. Trace Architecture

Figure 1:
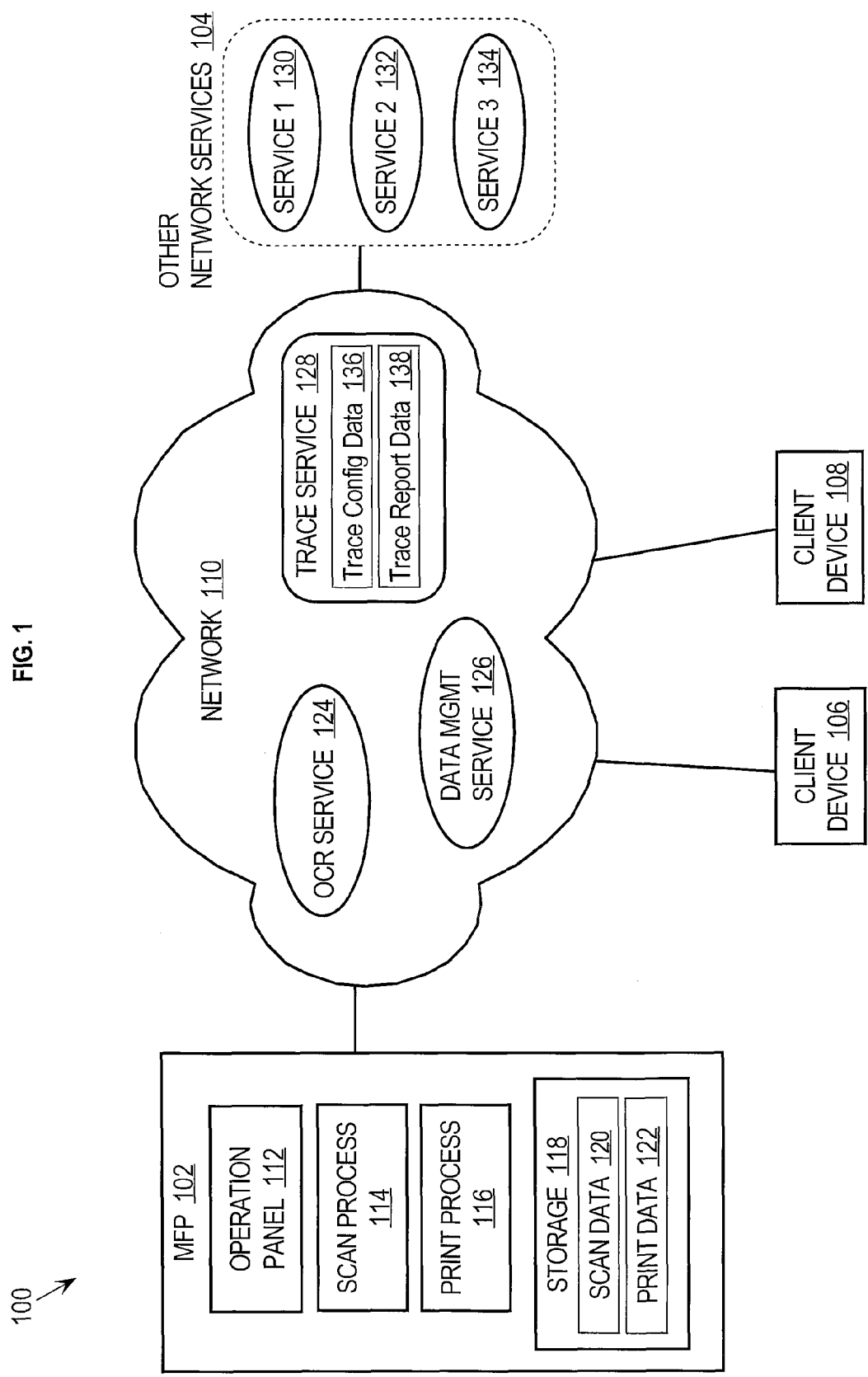
FIG. 1 is a block diagram that depicts an example architecture for processing scanned document data.

FIG. 1 is a block diagram that depicts an example architecture for tracking the processing of electronic document data by network services using trace. Architecture 100 includes a multi-function peripheral (MFP) 102, one or more other network services 104 and client devices 106, 108, communicatively coupled via a network 110. Network 110 may be implemented by any medium or mechanism that provides for the exchange of data between the elements of FIG. 1. Examples of network 110 include, without limitation, a network such as a Local Area Network (LAN), Wide Area Network (WAN), Ethernet or the Internet, or one or more terrestrial, satellite or wireless links.

MFP 102 is a device that performs two or more functions, such as scanning, printing and faxing. In the example depicted in FIG. 1, MFP 102 includes an operation panel 112, a scan process 114, a print process 116 and storage 116. MFP 102 may include processes for performing other functions, such as faxing. The operation panel 112 is configured to display information to a user and to accept user input. The particular implementation of the operation panel 112 may vary depending upon a particular implementation. For example, the operation panel 112 may include a screen on which a graphical user interface (GUI) is displayed. In addition, the screen may be a touch screen that allows a user to select icons and GUI objects on the GUI. The GUI may be updated to reflect changes in the functionality offered by the MFP 102. The operation panel 112 may also include control buttons and a numeric keypad for receiving user input.

Figure 2:
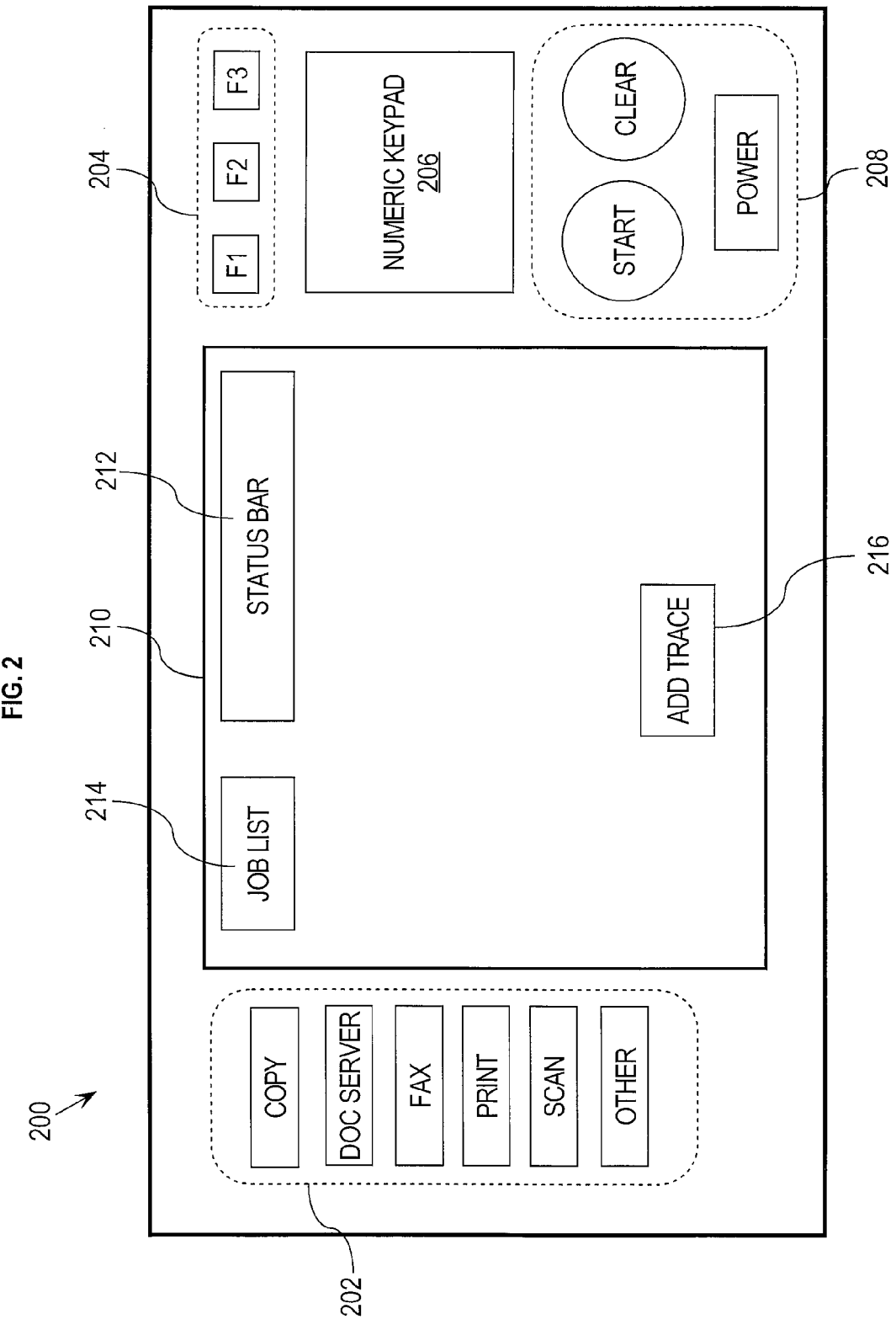
FIG. 2 depicts an example operation panel of a scanning device.

FIG. 2 depicts an example operation panel 200 of MFP 102. Operation panel 200 includes a set of user interface controls 202 for activating functions of the MFP 102. The functions depicted in FIG. 2 include copy, connect to a document server, fax, print, copy and other functions. These functions are provided as examples of typical functions that may be implemented on an MFP, but the functions implemented on any particular MFP may vary depending upon the implementation. Operation panel 200 also includes a set of function buttons 204 that may be assigned to various functions provided on MFP 102. Operation panel 200 also includes a numeric keypad 206 and a set of user controls 208 for toggling the power, starting a function and clearing the current function. These are examples of the user controls that are typically included on an MFP and different more or few user controls may be provided, depending upon a particular implementation.

Operation panel 200 also includes a GUI 210 for displaying information and receiving user input. GUI 210 may be a touch screen that is capable of detecting user selection of icons and GUI objects displayed on GUI 210. In the present example, GUI 210 includes a status bar GUI object 212 that displays status information, such as the status of the MFP 102 or the status of one or more scan jobs. GUI 210 also includes a job list GUI object 214 which, when selected, displays a list of jobs associated with the MFP 102, for example, scan jobs that have been processed and/or scan jobs that are currently being processed. GUI 210 also includes an add trace GUI object 216 that initiates tracking of the processing of electronic document data by network services, as described in more detail hereinafter. GUI 210 may include any number of other GUI objects depending upon a particular implementation, and the GUI objects depicted in FIG. 2 are provided as non-limiting examples.

Scan process 114 is configured to cause one or more printed documents to be scanned by MFP 102 and generate electronic document data, in the form of scanned document data, that represents the one or more printed documents. The scanned document data may be in a variety of formats, depending upon a particular implementation. One example format is the portable document format (PDF) by Adobe Systems, Inc. Scan process 114 may be initiated, for example, in response to a user selection of the start user control 208. MFP 102 may also include a capability to convert scanned document data from a non-text format, such as PDF, to a text-based format, using for example, optical character recognition (OCR). MFP 102 may also include the capability to transmit the scanned document data to another location or device, for example, to a computer connected to the MFP 102 or over a network to a network device.

Print process 116 is configured to process electronic document data and cause MFP 102 to print one or more documents represented by the electronic document data. For example, MFP 102 may receive electronic document data in the form of a print job from client devices 106, 108. Print process 116 processes the print job and causes one or more electronic documents represented by the print job to be printed.

Storage 116 may be any combination of volatile or non-volatile storage for storing data used by MFP 102. For example, the storage 116 may be random access memory (RAM), one or more disks, or any combination of RAM and one or more disks for storing scanned document data. As depicted in FIG. 1, storage 116 may store scan data 120 and print data 122. MFP 102 may include other modules and processes that are not depicted in FIG. 1 for purposes of brevity.

Network 110 includes several network services, including an OCR service 124, a data management (mgmt) service 126 and a trace network service, referred to hereinafter as "trace service 128." These and other network services may reside on one or more network devices that are part of network 110. The OCR service 124, data management service 126 and trace service 128 are provided as example network services and other network services may be used, depending upon a particular implementation. OCR service 124 is configured to process electronic document data, for example PDF data, and generate text-based data. Data management service 126 is configured to provide for the storage and retrieval of data, for example both within network 110 and external to network 110. For example, data management service 126 may store scanned document data received from MFP 102 and text-based data from OCR service 124. Data management service 126 may then later supply the scanned document data and/or the text-based data to MFP 102 for printing. As another example, data management service 126 may supply the scanned document data and/or the text-based data to client devices 106, 108 or to one or more of the other network services 104 for further processing. For example, suppose that service 1 130 is an archival service. Data management service 126 may supply the scanned document data and/or the text-based data to the archival service for archiving.

Trace service 128 is configured to track the processing of electronic document data by network services, for example, OCR service 124, data management service 126, or other network services 104. Trace service 128 is further configured to generate trace report data that indicates results of the processing of the electronic document data by network services.

Trace service 128 is also configured to transmit the trace report data to one or more specified recipients.

Client devices 106, 108 receive trace report data that documents the processing of electronic document data by one or more network services, as described in more detail hereinafter. Client devices 106, 108 may also generate electronic document data, for example print jobs, that is provided to MFP 102. Client devices 106, 108 may be implemented as any type of client device. Examples of client devices 106, 108 include, without limitation, personal or laptop computers, workstations, cellular telephony devices such as cell phones, personal digital assistants (PDAs), etc.

III. Using Trace to Track the Processing of Electronic Document Data by Network Services A. Initiating Trace The tracking of the processing of electronic document data by trace service 128 may be initiated in several different ways and the invention is not limited to any particular approach for initiating trace. For example, a user of client devices 106, 108 may communicate with trace service 128 and request that trace be performed on particular electronic document data. Trace service 128 may be configured to provide a user interface for this purpose. The request may identify particular electronic document data for which trace is to be performed. Alternatively, a user may request that trace be performed based upon attributes of electronic document data. Example attributes include, without limitation, name, type, size, source, etc. Network services may also request that trace be performed for specified electronic document data. For example, data management service 126 may request that trace be performed on specified electronic document data.

As another example, trace configuration (config) data 136 may specify attributes of electronic document data that is to be traced. Example attributes include, without limitation, name, type, size, source, etc. For example, the trace configuration data 136 may specify that all electronic document data associated with an accounting function is to be traced. Trace configuration data 136 may be generated and maintained by a user, such as an administrator. Trace service 128 accesses the trace configuration data 136 to determine whether trace is to be used for particular electronic document data.

Trace may also be initiated by a user via a device, such as MFP 102. A user of MFP 102 may select the add trace GUI object 216 to initiate trace for particular electronic document data. For example, suppose that a user uses MFP 102 to scan a printed document and transmit the scanned document data to an archival network service 130 in the other network services 104. An example workflow at MFP 102 is for the user to select the add trace GUI object 216, followed by the scan user interface control 202. In response, the MFP 102 may display on the GUI 210 a list of scan destinations, one of which may be the archival network service 130. The user selects a GUI object that corresponds to the archival network service 130 and the scan process starts. As another example, to reduce the number of steps for the user, the user interface controls 202 or the GUI 210 may include a "scan to archive" option that corresponds to scanning a printed document and sending the scanned document data to the archival network service 130. Once selected, MFP 102 scans the printed document, generates scanned document data and transmits the scanned document data to the archival network service 130. MFP 102 may notify trace service 128 that tracing should be performed for the scanned document data. Alternatively, MFP 102 may generate data that indicates that tracing should be performed for the scanned document data and either include the data in or with the scanned document data or separately transmit the data. Network services that process the electronic document data may be configured to determine whether the scanned document data includes data that indicates that tracing should be performed for the scanned document data and if so, then notify trace service 128. Alternatively, trace service 128 may inspect electronic document data transmitted from MFP 102 to determine whether tracing should be performed for the electronic document data. For example, for electronic document data that is to be processed by a network service, MFP 102 may be configured to transmit the electronic document data to a specified port on a network device so that the electronic document data will be transmitted to trace service 128, which then forwards the electronic document data to the network service.

B. Performing Trace

Once trace has been specified for particular electronic document data, trace service 128 monitors the processing of the particular electronic document data. Network services, such as OCR service 124, data management service 126 and other network services 104 may be configured to report processing status to trace service 128. For example, network services may report to trace service 128 upon completion of significant functions or may report to trace service 128 at specified times or intervals. Trace service 128 may be configured to request status data from network services, for example at specified times. The status data indicates the status of one or more operations being performed by the network services on the electronic document data. Status data may be provided from network services to trace service 128 using a wide variety of techniques. For example, status data may be communicated using an inter-process messaging protocol. As another example, status data may be stored by the one or more network services in a specified location, for example on a non-volatile storage of a network device, and then retrieved from that location by the trace service 128. The invention is not limited to any particular approach for providing status data from the network services to the trace service 128.

C. Reporting Trace

According to one embodiment of the invention, trace service 128 is configured to generate trace report data 138 that indicates results of the processing of electronic document data by one or more network services. The trace report data 138 may be useful in a variety of contexts, for example to satisfy audit or legal requirements. The trace report data 138 may include a wide variety of information, depending upon a particular implementation, and the invention is not limited to the trace report data 138 including any particular information. The trace report data 138 may specify, for each electronic document data, the network services that processed the electronic document data and the results of the processing. For example, the trace report data 138 may specify that particular electronic document data was processed by a particular network service at a certain date and time and may indicate whether the processing was successful. The trace report data 138 may further specify that the particular electronic document data was then processed by a second network service at a certain date and time and may indicate whether the processing was successful. Thus, the trace report data 138 may document the step-by-step processing of electronic document data by network services, which may be very useful for auditing purposes or to satisfy compliance requirements. The trace report data 138 may be in a variety of formats, that may vary depending upon a particular implementation and the invention is not limited to the trace report data 138 being in any particular format. Example formats include, without limitation, text-base formats and non text-based formats, such as PDF.

Trace service 128 may be configured to transmit trace report data 138 to one or more recipients. Recipients of the trace report data 138 may be indicated by a user, for example, directly to trace service 128, by a user via MFP 102. For example, MFP 102 may be configured to display, in response to a user selection of the add trace GUI object 216, a list of trace report data recipients. The user may then select one or more recipients from the list. The data that indicates that tracing should be performed for the scanned document data may specify the one or more recipients selected by the user. The trace service 128 transmits the trace report data 138 to the one or more recipients specified by the data that indicates that tracing should be performed for the scanned document data. Alternatively, the trace configuration data 136 may specify the recipients of the trace report data 138. For example, a user may specify, via trace configuration data 136, that a particular recipient is to receive trace report data 138 for electronic document data having specified attributes. Example attributes include without limitation, name, type, size, source, processing time or window, etc.

Trace report data 138 may be provided to network services for processing. For example, trace service 128 may transmit trace report data 138 to a network archive service, so that the trace report data 138 may be persistently maintained. This may be useful in situations where a compliance requirement or other audit requirement applies to the processing of particular data. Trace report data 138 may also be provided to MFP 102. The MFP 102 may display the trace results on GUI 210.

Trace report data 138 may be transmitted to recipients using a variety of methods. For example, trace report data 138 may be transmitted in the body of an email or message, e.g., in SMS or MMS format, or as an attachment to an email or a message. As another example, trace report data 138 may be transmitted in a data file to a recipient. Alternatively, a reference or link to trace report data 138 may be transmitted to a recipient, where the reference or link allows a user or program to use the reference or link to retrieve the trace report data 138.

FIG. 3 is a flow diagram 300 that depicts an approach for tracking the processing of electronic document data, according to one embodiment of the invention. Although this embodiment is described in the context of scanned document data for purposes of explanation, the approach is applicable to any type of electronic document data. In step 302, an MFP scans one or more printed documents with trace and generates scanned document data. For example, as previously described herein, a user may select the add trace GUI object 216 on GUI 210 to activate the trace functionality described herein.

In step 304, the scanning device transmits the scanned document data to a network service for processing. For example, MFP 102 may transmit the scanned document data to a particular port on a network device within network 110 that corresponds to the network service. This may cause the scanned document data to be routed through the trace service 128. Alternatively, the port may correspond to trace service 128, which then forwards the scanned document data to another network service. As described herein, data that indicates that tracing should be performed for the scanned document data may be generated and included with the scanned document data.

In step 306, one or more network services process the scanned document data and trace service 128 tracks the processing of the scanned document data by the one or more network services. For example, OCR service 124 may first process the electronic document data to generate text-based electronic document data that is then stored by data management service 126.

In step 308, the trace service generates trace report data that indicates results of the one or more network services processing the electronic document data. Continuing with the prior example, trace service 128 generates trace report data 138 that specifies results of the processing of the scanned document data by OCR service 124 and data management service 126. For example, the trace report data 138 may specify that the OCR service 124 was successful and include information about the results, such as a number of bytes in the text-based electronic document data and a date and time when the text-based electronic document data was generated. The trace report data 138 may also specify that the data management service 126 stored the text-based electronic document data at a particular date and time and may also provide a location.

In step 310, the trace service transmits the trace report data to one or more recipients. For example, trace service 128 transmits the trace report data 138 to one or more of MFP 102, client devices 106, 108 and one or more network services.

Although the FIG. 3 is depicted and described in the context of tracking the processing by network services of scanned document data generated by an MFP, the invention is not limited to this context. For example, the approach is applicable to electronic document data transmitted by clients 106, 108 to network services in network 110, or other network services 104.

FIG. 4 is a message ladder diagram 400 that depicts an example message exchange between elements of FIG. 1 while tracking the processing of electronic document data using trace. In step 402, user requests that MFP 102 scan one or more printed documents with trace and generate scanned document data. For example, as previously described herein, a user may select the add trace GUI object 216 on GUI 210 to activate the trace functionality described herein. MFP 102 generates scanned document data that represents the one or more printed documents and in step 404, MFP 102 transmits the scanned document data to a network service for processing. In the present example, MFP 102 transmits the scanned document data to OCR service 124. In step 406, OCR service 124 processes the scanned document data and converts the scanned document data to text-based data.

In step 408, status data is provided to trace service 128. The status data indicates results of OCR service 124 converting the scanned document data to text-based data. The status data may indicate, for example, whether the conversion was successful, a date and time at which the conversion was performed and/or completed and attributes of the resulting text-based data, such as the number of bytes of text-based data and the format of the text-based data. OCR service 124 may transmit the status data to trace service 128. Alternatively, trace service 128 may request the status data from OCR service 124.

In step 408, OCR service 124 transmits the text-based data to data management service 126. In step 412, data management service 126 stores the text-based data for later retrieval. Data management service 126 may store the text-based data, for example, on a network device within network 110, or on a network device external to network 110.

In step 414, status data is provided to trace service 128. The status data indicates results of data management service 126 storing the scanned document data. The status data may indicate, for example, whether the storing operation was successful, a date and time at which the storing operation was performed and/or completed, as well as other information such as a location where the text-based data was stored, a size of the data file, a format of the data file, etc. Data management service 126 may transmit the status data to trace service 128.

Alternatively, trace service 128 may request the status data from data management service 126.

In step 416, trace service 128 generates trace report data that indicates results of the processing of electronic document data. In the present example, the trace report data indicates results of the processing of the scanned document data by OCR service 124 and processing of the text-based data by data management service 126. In step 418, the trace report data is transmitted to one or more recipients as previously described herein.

IV. Implementation Mechanisms

Although the flow diagrams of the present application depict a particular set of steps in a particular order, other implementations may use fewer or more steps, in the same or different order, than those depicted in the figures.

According to one embodiment of the invention, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
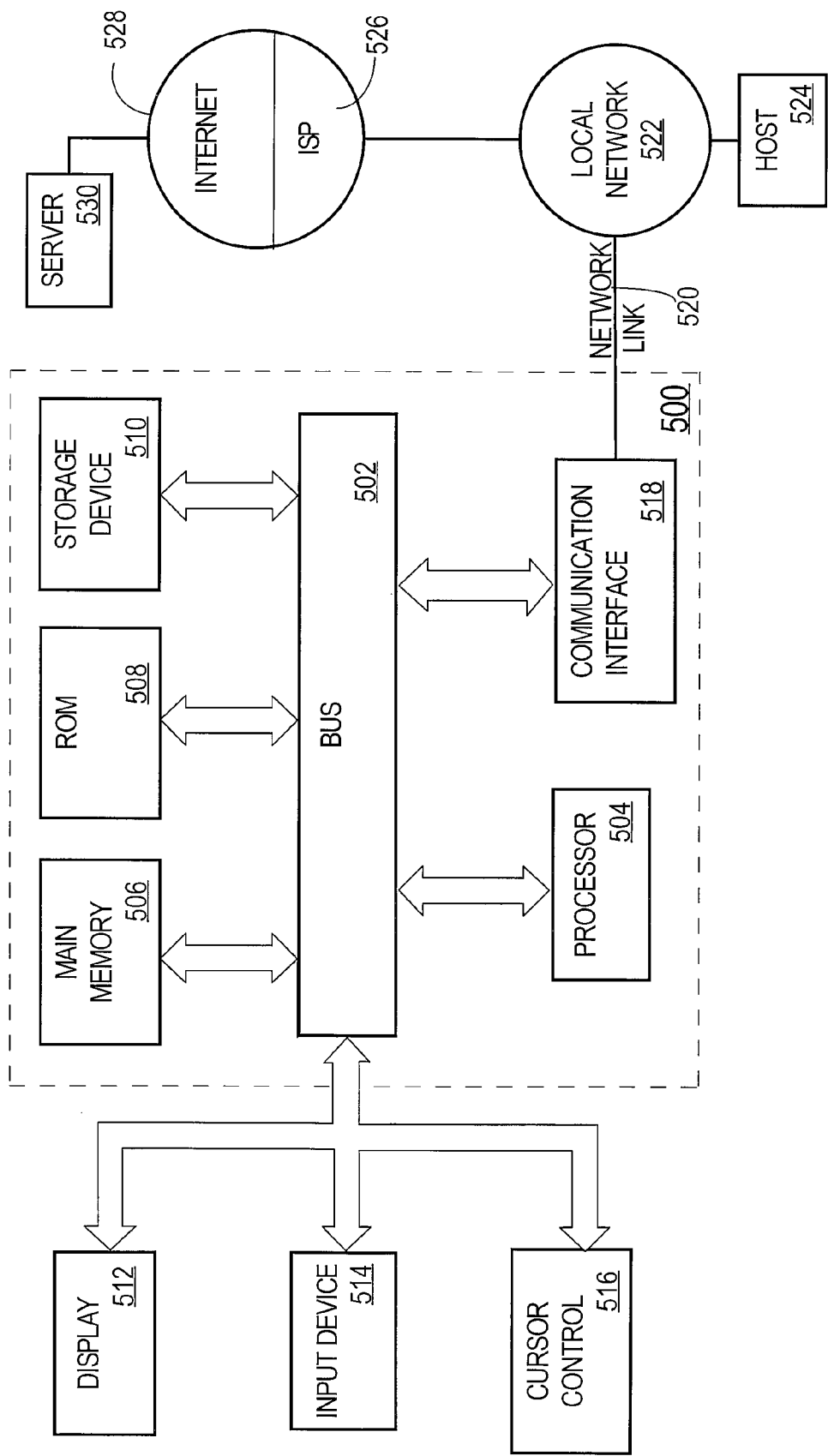
FIG. 5 is a block diagram of a computer system on which embodiments of the invention may be implemented.

FIG. 5 is a block diagram that depicts an example computer system 500 upon which embodiments of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic or computer software which, in combination with the computer system, causes or programs computer system 500 to be a special-purpose machine. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operation in a specific manner. In an embodiment implemented using computer system 500, various computer-readable media are involved, for example, in providing instructions to processor 504 for execution. Such a medium may take many forms, including but not limited to, non-volatile media and volatile media. Non-volatile media includes, for example, optical or magnetic disks, such as storage device 510. Volatile media includes dynamic memory, such as main memory 506. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

In the foregoing specification, embodiments of the invention have been described with reference to numerous specific details that may vary from implementation to implementation. Thus, the sole and exclusive indicator of what is, and is intended by the applicants to be the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for tracking the processing of electronic document data by one or more network services, the computer-implemented method comprising:
   a trace network service receiving, from a multi-function peripheral (MFP) over a network, electronic document data that represents one or more electronic documents, wherein the trace network service executes separate from the MFP;
   the trace network service executing separate from the MFP determining whether tracing has been specified for the electronic document data by examining the electronic document data to determine whether the electronic document data contains data that indicates that tracing has been specified for the electronic document data; and
   in response to the trace network process executing separate from the MFP determining that tracing has been specified for the electronic document data by examining the electronic document data to determine whether the electronic document data contains data that indicates that tracing has been specified for the electronic document data,
   the trace network service executing separate from the MFP:
   identifying one or more attributes of the electronic document data, and determining whether, based upon trace configuration data, tracing has been specified for any of the one or more attributes of the electronic document data,
   tracking the processing of the electronic document data by one or more network services that are separate from the trace network process,
   generating trace report data that indicates results of the processing of the electronic document data by the one or more network services that are separate from the trace network process, and
   transmitting the trace report data to one or more specified recipients.

2. The computer-implemented method as recited in claim 1, wherein the data contained in the electronic document data that indicates that tracing has been specified for the electronic document data was added to the electronic document data at a client device.

3. The computer-implemented method as recited in claim 1, wherein the electronic document data is one or more of scanned document data, print data and facsimile data.

4. The computer-implemented method as recited in claim 1, wherein the trace network service tracking the processing of the electronic document data by one or more network services includes the trace network service receiving from the one or more network services status data that indicates a status of one or more operations being performed by the one or more network services on the electronic document data.

5. The computer-implemented method as recited in claim 4, wherein the trace network service requests the status data from the one or more network services.

6. The computer-implemented method as recited in claim 1, wherein the electronic document data is first received by the trace network service from the MFP and is then forwarded by the trace network service to the one or more network services.

7. One or more non-transitory computer-readable media for tracking the processing of electronic document data by one or more network services, the one or more non-transitory computer-readable media storing instructions which, when processed by one or more processors, cause:
   a trace network service receiving, from a multi-function peripheral (MFP) over a network, electronic document data that represents one or more electronic documents, wherein the trace network service executes separate from the MFP;
   the trace network service executing separate from the MFP determining whether tracing has been specified for the electronic document data by examining the electronic document data to determine whether the electronic document data contains data that indicates that tracing has been specified for the electronic document data; and
   in response to the trace network process executing separate from the MFP determining that tracing has been specified for the electronic document data by examining the electronic document data to determine whether the electronic document data contains data that indicates that tracing has been specified for the electronic document data,
   the trace network service executing separate from the MFP:
   identifying one or more attributes of the electronic document data, and determining whether, based upon trace configuration data, tracing has been specified for any of the one or more attributes of the electronic document data,
   tracking the processing of the electronic document data by one or more network services that are separate from the trace network process,
   generating trace report data that indicates results of the processing of the electronic document data by the one or more network services that are separate from the trace network process, and
   transmitting the trace report data to one or more specified recipients.

8. The one or more non-transitory computer-readable media as recited in claim 7, wherein the data contained in the electronic document data that indicates that tracing has been specified for the electronic document data was added to the electronic document data at a client device.

9. The one or more non-transitory computer-readable media as recited in claim 7, wherein the electronic document data is one or more of scanned document data, print data and facsimile data.

10. The one or more non-transitory computer-readable media as recited in claim 7, wherein the trace network service tracking the processing of the electronic document data by one or more network services includes the trace network service receiving from the one or more network services status data that indicates a status of one or more operations being performed by the one or more network services on the electronic document data.

11. The one or more non-transitory computer-readable media as recited in claim 10, wherein the trace network service requests the status data from the one or more network services.

12. The one or more non-transitory computer-readable media as recited in claim 7, wherein the electronic document data is first received by the trace network service from the MFP and is then forwarded by the trace network service to the one or more network services.

13. An apparatus for tracking the processing of electronic document data by one or more network services, the apparatus comprising: one or more processors; and a memory storing instructions which, when processed by the one or more processors, causes:
   a trace network service receiving, from a multi-function peripheral (MFP) over a network, electronic document data that represents one or more electronic documents, wherein the trace network service executes separate from the MFP;
   the trace network service executing separate from the MFP determining whether tracing has been specified for the electronic document data by examining the electronic document data to determine whether the electronic document data contains data that indicates that tracing has been specified for the electronic document data; and
   in response to the trace network process executing separate from the MFP determining that tracing has been specified for the electronic document data by examining the electronic document data to determine whether the electronic document data contains data that indicates that tracing has been specified for the electronic document data, the trace network service executing separate from the MFP:
   identifying one or more attributes of the electronic document data, and determining whether, based upon trace configuration data, tracing has been specified for any of the one or more attributes of the electronic document data,
   tracking the processing of the electronic document data by one or more network services that are separate from the trace network process,
   generating trace report data that indicates results of the processing of the electronic document data by the one or more network services that are separate from the trace network process, and
   transmitting the trace report data to one or more specified recipients.

14. The apparatus as recited in claim 13, wherein the data contained in the electronic document data that indicates that tracing has been specified for the electronic document data was added to the electronic document data at a client device.

15. The apparatus as recited in claim 13, wherein the electronic document data is one or more of scanned document data, print data and facsimile data.

16. The apparatus as recited in claim 13, wherein the trace network service tracking the processing of the electronic document data by one or more network services includes the trace network service receiving from the one or more network services status data that indicates a status of one or more operations being performed by the one or more network services on the electronic document data.

17. The apparatus as recited in claim 16, wherein the trace network service requests the status data from the one or more network services.

* * * * *